US012771606B2

(12) United States Patent
Kolla et al.

(10) Patent No.: US 12,771,606 B2
(45) Date of Patent: Oct. 20, 2026

(54) INTEGRATION OF NETWORK SEGMENTS AND SECURITY COMPONENTS INTO CONTAINERS AND HYBRID CLOUD ENVIRONMENTS

(71) Applicant: Kyndryl, Inc., New York, NY (US)

(72) Inventors: Hari Krishna Kolla, Bangkok (TH); Kim Poh Wong, Singapore (SG)

(73) Assignee: Kyndryl, Inc., New York, NY (US)

( * ) Notice: Subject to any disclaimer, the term of this patent is extended or adjusted under 35 U.S.C. 154(b) by 302 days.

(21) Appl. No.: 17/241,409

(22) Filed: Apr. 27, 2021

(65) Prior Publication Data

US 2022/0345367 A1 Oct. 27, 2022

(51) Int. Cl.

| | |
|---|---|
| ***H04L 41/0894*** | (2022.01) |
| ***H04L 41/084*** | (2022.01) |
| ***H04L 41/0866*** | (2022.01) |
| ***H04L 41/0895*** | (2022.01) |
| ***H04L 41/12*** | (2022.01) |

(52) U.S. Cl.

CPC ........ *H04L 41/0894* (2022.05); *H04L 41/084* (2013.01); *H04L 41/0866* (2013.01); *H04L 41/0895* (2022.05); *H04L 41/12* (2013.01)

(58) Field of Classification Search

CPC ......... H04L 41/08; H04L 41/084–0846; H04L 41/0893–0895; H04L 41/12–122; H04L 63/14–205; H04L 41/0866–0873; H04L 41/0896–0897; H04L 63/10–108; H04L 63/20–205

See application file for complete search history.

(56) References Cited

U.S. PATENT DOCUMENTS

| | | | | |
|---|---|---|---|---|
| 8,621,051 | B2 * | 12/2013 | Agarwala | G06F 3/0629 709/224 |
| 8,631,099 | B2 * | 1/2014 | Morgan | G06F 9/5088 709/228 |
| 8,874,755 | B1 * | 10/2014 | Deklich | G06F 15/177 709/225 |
| 9,043,786 | B1 * | 5/2015 | Hodge | G06F 9/5077 718/1 |
| 9,461,969 | B2 * | 10/2016 | Watt | H04L 63/0272 |
| 9,503,387 | B2 | 11/2016 | Huang | |
| 9,838,370 | B2 | 12/2017 | Doering | |
| 10,171,310 | B2 | 1/2019 | Hernandez | |
| 10,534,596 | B2 | 1/2020 | Kapoor | |
| 10,601,871 | B2 * | 3/2020 | Hosie | H04L 63/20 |

(Continued)

OTHER PUBLICATIONS

"What is orchestration?". Red Hat. https://www.redhat.com/en/topics/automation/what-is-orchestration Oct. 15, 2019.*

(Continued)

*Primary Examiner* — Brendan Y Higa

(74) *Attorney, Agent, or Firm* — Erik Swanson; Andrew D. Wright; Calderon Safran & Wright P.C.

(57) ABSTRACT

A processor may identify one or more requirements based on a specific field. The processor may capture the one or more requirements. The one or more requirements may be based on a particular structure. The processor may orchestrate the one or more requirements based on respective requests of the one or more requirements. The processor may store the orchestration of the one or more requirements as respective artifacts.

20 Claims, 6 Drawing Sheets

100

(56) References Cited

U.S. PATENT DOCUMENTS

| | | | | |
|---|---|---|---|---|
| 11,321,064 | B1 * | 5/2022 | Frey | H04L 63/1433 |
| 2008/0270971 | A1 * | 10/2008 | Agrawal | G06F 30/00 717/102 |
| 2010/0180107 | A1 * | 7/2010 | Chaganti | G06F 15/177 713/1 |
| 2013/0290542 | A1 * | 10/2013 | Watt | H04L 51/42 709/226 |
| 2013/0346619 | A1 * | 12/2013 | Panuganty | H04L 41/12 709/226 |
| 2015/0096011 | A1 * | 4/2015 | Watt | G06F 3/0647 726/15 |
| 2015/0121483 | A1 * | 4/2015 | Perez | H04L 63/08 726/5 |
| 2015/0261517 | A1 * | 9/2015 | Hodge | H04L 67/10 717/176 |
| 2015/0261842 | A1 * | 9/2015 | Huang | G06F 16/284 707/758 |
| 2015/0264128 | A1 * | 9/2015 | Huang | H04L 67/1006 709/203 |
| 2015/0347123 | A1 * | 12/2015 | Zhu | G06F 8/65 717/172 |
| 2016/0072899 | A1 * | 3/2016 | Tung | H04L 41/0843 709/223 |
| 2016/0156664 | A1 * | 6/2016 | Nagaratnam | H04L 63/20 726/1 |
| 2017/0041189 | A1 * | 2/2017 | Aswathanarayana | H04L 67/34 |
| 2017/0041347 | A1 * | 2/2017 | Nagaratnam | H04L 63/0227 |
| 2018/0205759 | A1 * | 7/2018 | Hosie | H04L 67/10 |
| 2018/0213036 | A1 * | 7/2018 | Vasetsky | G06F 9/445 |
| 2019/0363905 | A1 * | 11/2019 | Yarvis | G06F 9/5066 |
| 2020/0110638 | A1 * | 4/2020 | Asthana | H04L 67/51 |
| 2020/0177634 | A1 * | 6/2020 | Hwang | H04L 63/1433 |
| 2020/0252451 | A1 * | 8/2020 | Nandavar | H04L 41/40 |
| 2020/0264919 | A1 | 8/2020 | Vukovic | |
| 2021/0266224 | A1 * | 8/2021 | Lifshitz | H04L 41/0853 |
| 2022/0121470 | A1 * | 4/2022 | Saxena | G06F 9/5072 |
| 2022/0210194 | A1 * | 6/2022 | Parekh | G06F 21/604 |

OTHER PUBLICATIONS

Teo, Marry, et al. "A review on cloud computing security." JOIV: International Journal on Informatics Visualization 2.4-2 (2018): 293-298.*

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

INTEGRATION OF NETWORK SEGMENTS AND SECURITY COMPONENTS INTO CONTAINERS AND HYBRID CLOUD ENVIRONMENTS

BACKGROUND

The present disclosure relates generally to the field of hybrid cloud environments, and more specifically to integrating different network segments and security components into containers and hybrid cloud environments.

Currently, some clients/users are unable to use network segments and security components in a current environment due to migration of existing workloads to containers and hybrid cloud environments. Further, a client's workload in an existing environment needs to be changed after migrating to containers and hybrid cloud environments.

SUMMARY

Embodiments of the present disclosure include a method, system, and computer program for integrating different network segments and security components into containers and hybrid cloud environments. A processor may identify one or more requirements based on a specific field. The processor may capture the one or more requirements. The one or more requirements may be based on a particular structure. The processor may orchestrate the one or more requirements based on respective requests of the one or more requirements. The processor may store the orchestration of the one or more requirements as respective artifacts.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
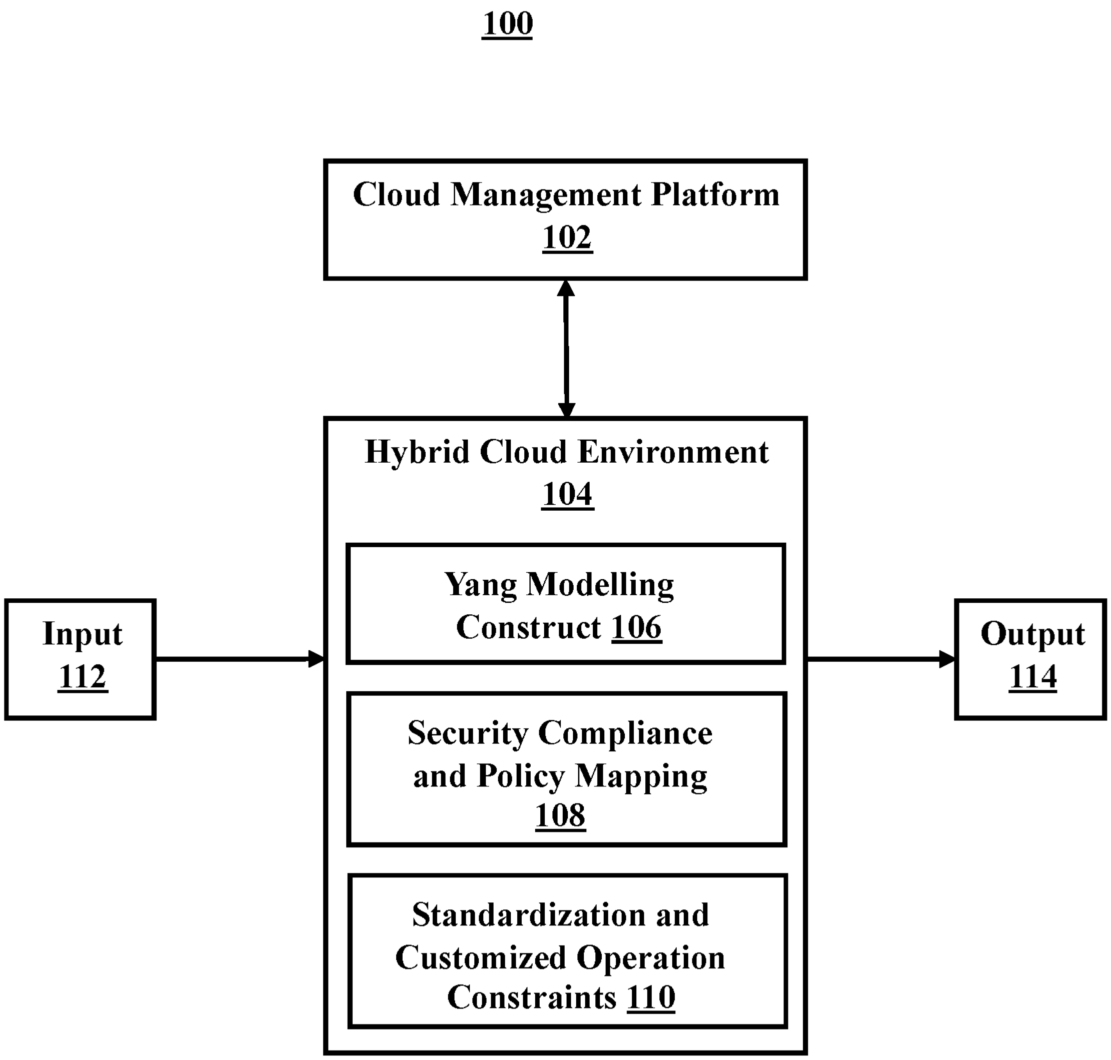
FIG. 1 illustrates a block diagram of a system for integrating different network segments and security components into containers and hybrid cloud environments, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of hybrid cloud environments, and more specifically to integrating different network segments and security components into containers and hybrid cloud environments. Currently, some clients/users are unable to use network segments and security components in a current environment due to migration of existing workloads to containers and hybrid cloud environments. Further, a client's workload in an existing environment needs to be changed after migrating to containers and hybrid cloud environments.

Accordingly, to migrate workloads, a change needs to occur, but there is currently no specific method to determine changes needed to occur and how to ensure impacts on workloads and/or migration are managed to reduce the possible challenges. This disclosure details a novel solution to reduce these challenges.

Before turning to the provided solution, it is noted that a hybrid cloud refers to a mixed computing, storage, and services environment that is made up of on-premises infrastructure, private cloud services, and a public cloud. Further, a container is an optimized operating system that provides a lightweight, highly secure operating system that comes with Docker and Kubernete runtimes pre-installed.

As a summary of that which is to be disclosed throughout this disclosure, one or more requirements of target network segments and/or security components for containers and hybrid cloud environments are captured in a requirement specification. The specification is automatically checked against a source content of a client's current environment with a conformance checker, where the source content is to be migrated to the target containers and hybrid cloud environments. It is then determined whether a predetermined design (e.g., for mitigation) and deployment conform to the specification with audit compliance and regulatory requirements.

In some embodiments, network segments are required to house continuously changing containers and hybrid cloud environments, which have details that are captured and stored in a network model. The network model is then checked against the existing client's environment with an intelligent, and modelling, mapping. Further, security components are also constructed to control security parameters that may be needed. In some embodiments, a specific module is generated to check different network segments, and security components, which ensures integration points and controls are in place for the containers and hybrid cloud environments.

In some embodiments, an existing (client) environment includes: current IP addresses, routing and edge gateways, sources and destinations, protocols (e.g., BGP, OSPF, etc.), and security components. In some embodiments, the novel features of this disclosure include the use of: Yang modelling with mesh routing, Gestalt theory to streamline anything greater than its existing path, network mapping and consolidation, security control components, and the integration into containers and hybrid cloud; all of which adhere to compliance requirements.

In some embodiments, from the novel features, an output, e.g., containers and hybrid cloud environments, may include: migrated IP addresses, destined routing and edge gateways, source and destination end points, finalized protocols, injection of security component, and audit compliance per new environment.

Turning now to FIG. 1, illustrated is a block diagram of a system 100 for integrating different network segments and security components into containers and hybrid cloud environments, in accordance with embodiments of the present disclosure. In some embodiments, the system 100 includes a cloud management platform 102, a hybrid cloud environment 104, an input 112, and an output 114. In some embodiments, the hybrid cloud environment 104 includes a Yang modelling construct 106, a security compliance and policy mapping 108, and standardization and customized operation constraints 110.

In some embodiments, the input 112 includes: an existing client environment, new client requirements, constraints, an optimal construct, continued learning artifacts, and security requirements; each of which is analyzed by the Yang modelling construct 106, the security compliance and policy mapping 108, and the standardization and customized operation constraints 110 to dynamically allocate and integrate network segments and security components into containers and the hybrid cloud environment 104.

In some embodiments, after analyzing the input 112, the hybrid cloud environment may output 114 different network and security models (from the Yang modelling construct 106), security compliance mapping (from the security compliance and policy mapping 108), and constraints and deviation in models (from the standardization and customized operation constraints 110).

Figure 2:
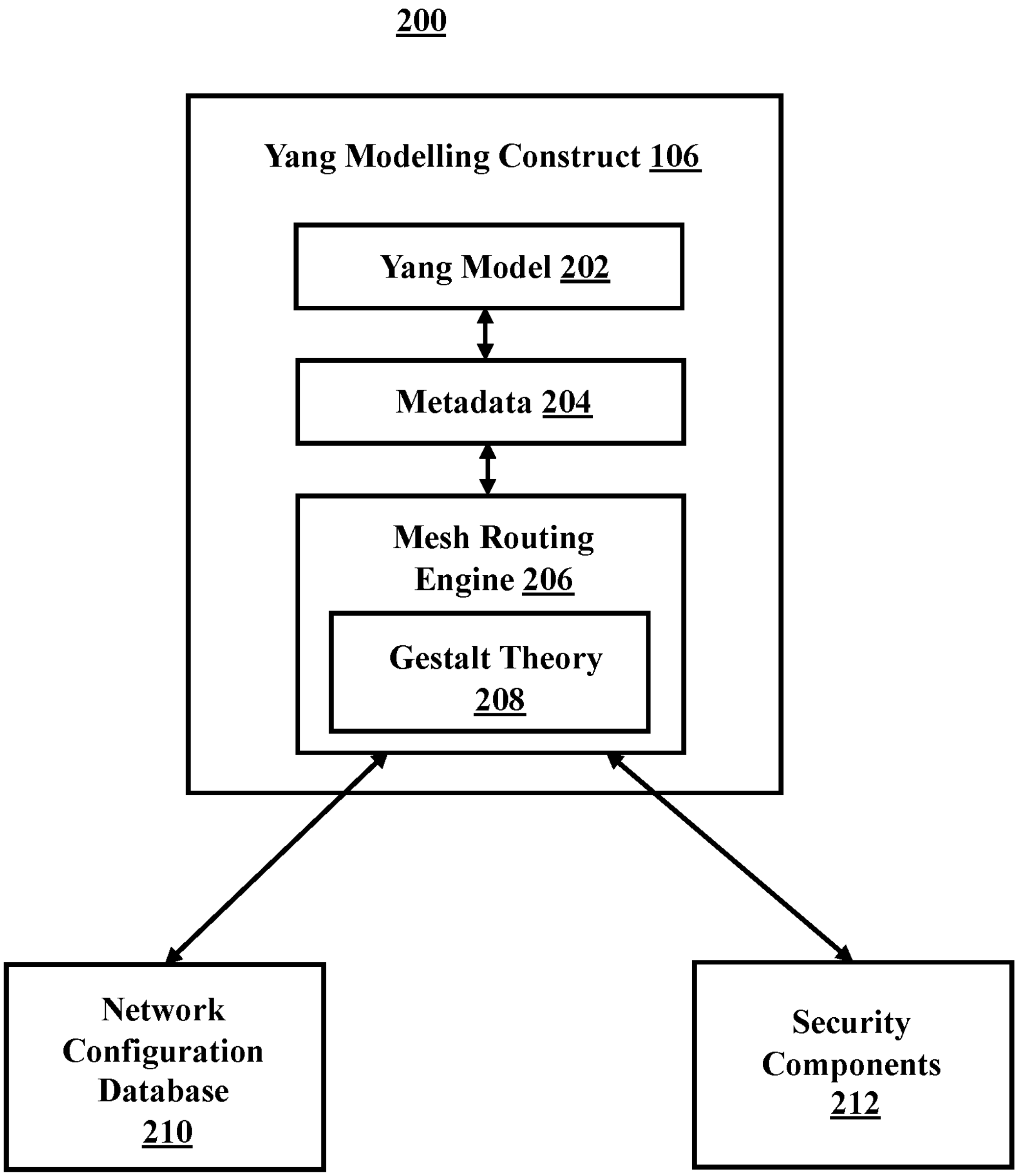
FIG. 2 illustrates a Yang modelling construct with mesh routing engine and Gestalt theory with integration controls, in accordance with embodiments of the present disclosure.

Turning now to FIG. 2, which illustrates a Yang modelling construct with mesh routing engine and Gestalt theory with integration controls 200, in accordance with embodiments of the present disclosure. In some embodiments, the Yang modelling construct 106 is the same Yang modelling construct 106 of FIG. 1, but could be any other Yang modelling construct.

In some embodiments, the Yang modelling construct 106 includes a Yang model 202, metadata 204 (e.g., configuration data, state data, operation type/data, notification type/data, routing controls, etc.), mesh routing engine 206 with Gestalt theory 208, network configuration database 210, and security components 212.

In some embodiments, a client application opens a mesh routing engine 206 (C) session to the Yang modelling construct 106 with the mesh routing engine 206 (S). Mesh routing engine 206 and the Yang modelling construct 106 exchange <hand-shake> messages containing a list of capabilities supported by each side, which allows the mesh routing engine 206 to learn the modules supported by the Yang modelling construct 106.

In some embodiments, the mesh routing engine 206 builds and sends an operation defined in the Yang model 202, which is encoded in XML and which is within the mesh routing engine 206's <rpc> element. The Yang modelling construct 106 receives and parses the <rpc> element. The Yang modelling construct 106 verifies the contents of the request against the data model defined in the Yang model 202.

The Yang modelling construct 106 performs the requested operation, possibly changing the network configuration database 210. The Yang modelling construct 106 builds the response, which contains the response, any requested data, and any errors. The Yang modelling construct 106 then sends the response, encoded in XML, within the mesh routing engine 206's <rpc-reply> element. The mesh routing engine 206 receives and parses the <rpc-reply> element and inspects the response and processes it as needed. In some embodiments, the Gestalt theory 208 emphasizes that the whole of anything is greater than its parts. That is, the attributes of the whole are not deducible from analysis of the parts in isolation, which enables the Yang modelling construct 106 to determine the proper network segments and security components to use.

In some embodiments, if all configurations from on-premises and cloud environments are available, the mesh routing engine 206 (with AI incorporation) will help to generate the Yang model 202 and monitor changes within the Yang model 202, with continued learning capability. The mesh routing engine 206 will also use the Gestalt theory 208 to create an intelligent engine which generates, monitors and dynamically adjust; in order to generate more efficient configuration/topology and store into configuration files (e.g., XML, JSON, repository, etc.), to be used for containers and hybrid cloud environments.

Figure 3:
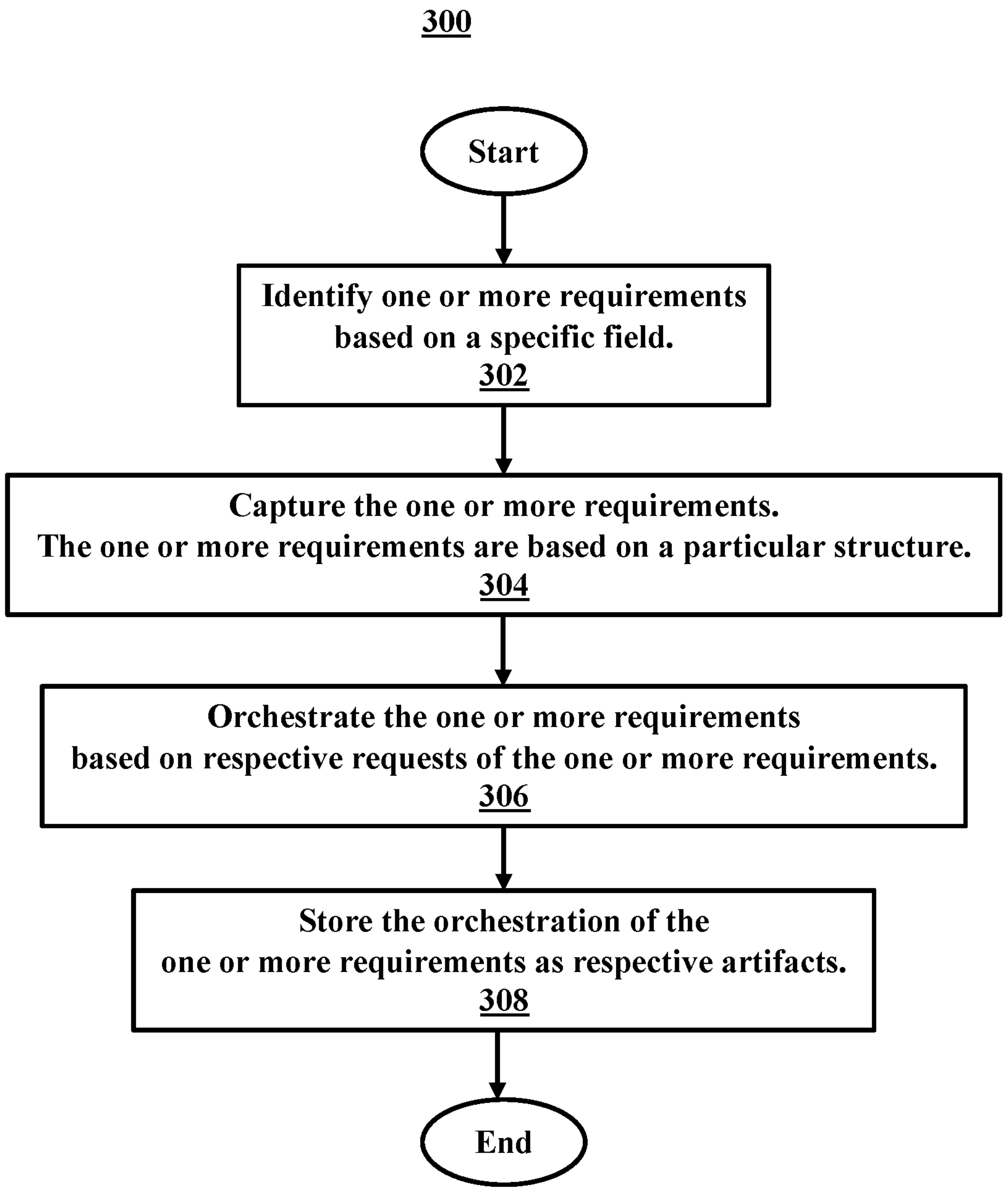
FIG. 3 illustrates a flowchart of an example method for integrating different network segments and security components into containers and hybrid cloud environments, in accordance with embodiments of the present disclosure.

Turning now to FIG. 3, illustrated is a flowchart of an example method 300 for integrating different network segments and security components into containers and hybrid cloud environments, in accordance with embodiments of the present disclosure. In some embodiments, the method 300 may be performed by a processor (e.g., of the system 100 of FIG. 1 and/or the Yang modelling construct with mesh routing engine and Gestalt theory with integration controls 200 of FIG. 2).

In some embodiments, the method 300 begins at operation 302, where the processor identifies one or more (new) requirements based on a specific field (e.g., an existing or new field). In some embodiments, the method 300 proceeds to operation 304, where the processor captures the one or more requirements. The one or more requirements may be based on a particular structure.

In some embodiments, the method 300 proceeds to operation 306, where the processor orchestrates the one or more requirements based on respective requests of the one or more requirements. In some embodiments, the method 200 proceeds to operation 308, where the processor stores the orchestration of the one or more requirements as respective artifacts (e.g., configuration file, etc.). In some embodiments, after operation 308, the method 300 may end.

In some embodiments, discussed below, there are one or more operations of the method 300 not depicted for the sake of brevity. Accordingly, in some embodiments, the processor may map the one or more requirements to network segments and/or security components. The processor may then integrate the mapping of the one or more requirements (e.g., which policy from which segment/component should be used, etc.) with the network segments and security components.

In some embodiments, the processor may store one or more changes in/of the respective artifacts. The processor may then collect/harvest one or more assets used by a standard (e.g., a protocol, which components to use, which format to use, etc.) associated with the network segments and security components.

In some embodiments, the processor may determine, based on the standard, a standard assignment. If it is determined/identified that the standard assignment exists, the processor may execute, based on the standard assignment, a standard template.

In another embodiment, the processor may determine, based on the standard, a custom assignment (e.g., it is identified that a standard assignment does not exist). In such an embodiment, the processor may map, based on the custom assignment, custom requirements. The processor may then analyze a final outcome. In some embodiments, the analysis of the final outcome is done by a Yang modelling with mesh routing, where a Gestalt theory is utilized to streamline: anything greater than its existing path, network mapping and consolidation, security control components, and integrate into containers and hybrid cloud.

In some embodiments, the process may store: data of the custom requirements (e.g., customized contents for continued optimization), a standard template associated with the custom requirements (e.g., store standard template execution contents for reference [effectively making the custom requirements a standard]), and store one or more changes of the standard template as a collected artifact (e.g., store changes from a standard template as harvested artifacts for reference).

In some embodiments, the processor may capture an outcome of the orchestration as the respective artifacts. In some embodiments, the processor may capture the outcome using modules such as a Yang model, mesh routing, and Gestalt theory as artifacts for reuse (e.g., for subsequent integration of different network segments and security components into containers and hybrid cloud environments).

It is noted that the advantages of the proposed method described above are that information is utilized from a client and existing harvested artifacts captured, with Yang modelling with mesh routing and Gestalt theory. Mapping is then managed based on an existing environment and/or requirements from the client. Further, the derived optimized network segments and security components provide necessary audit requirements, regulatory compliance, and an environment for the client to be able to continue operationalization of their workloads in containers and hybrid cloud environments.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
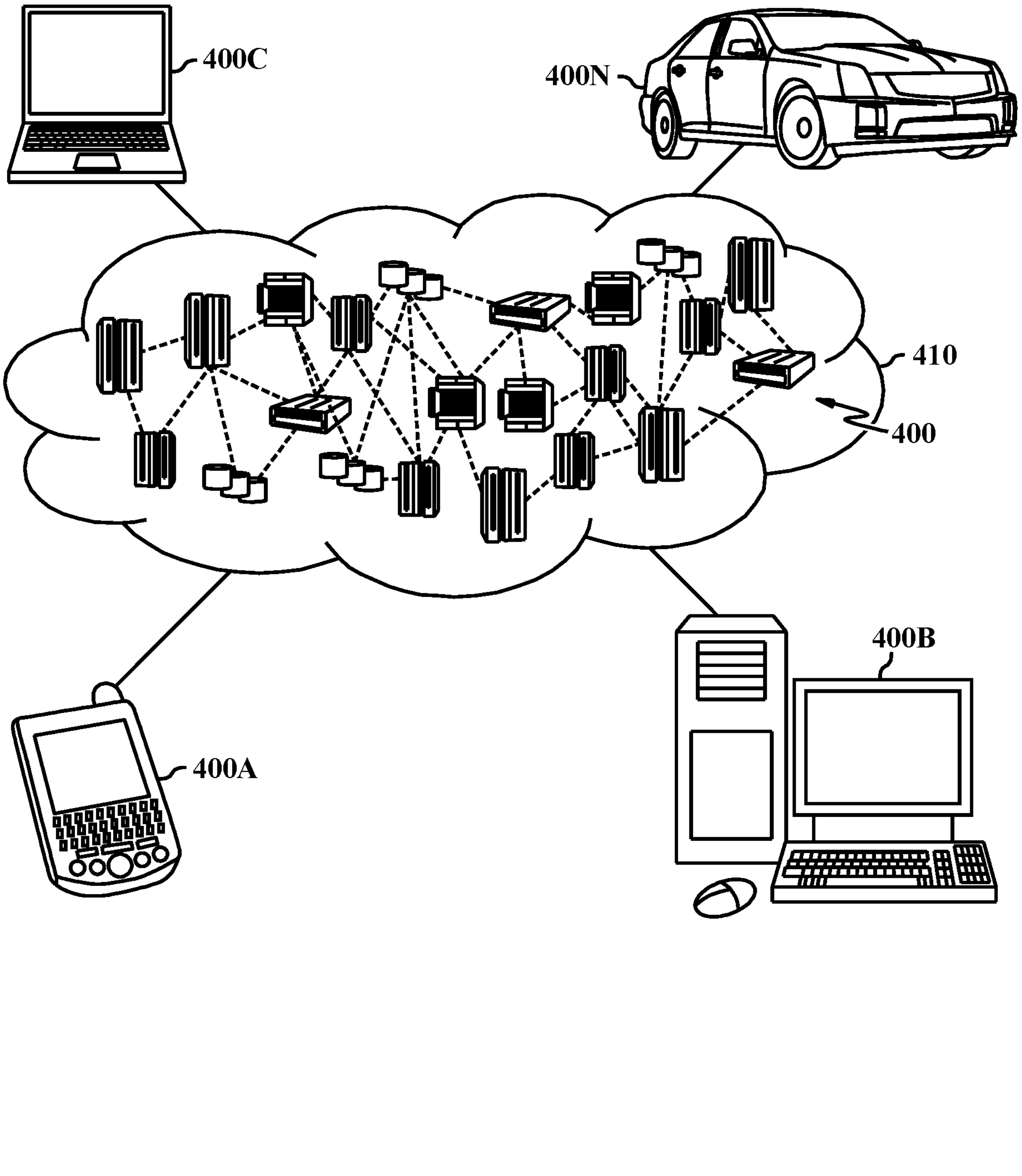
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
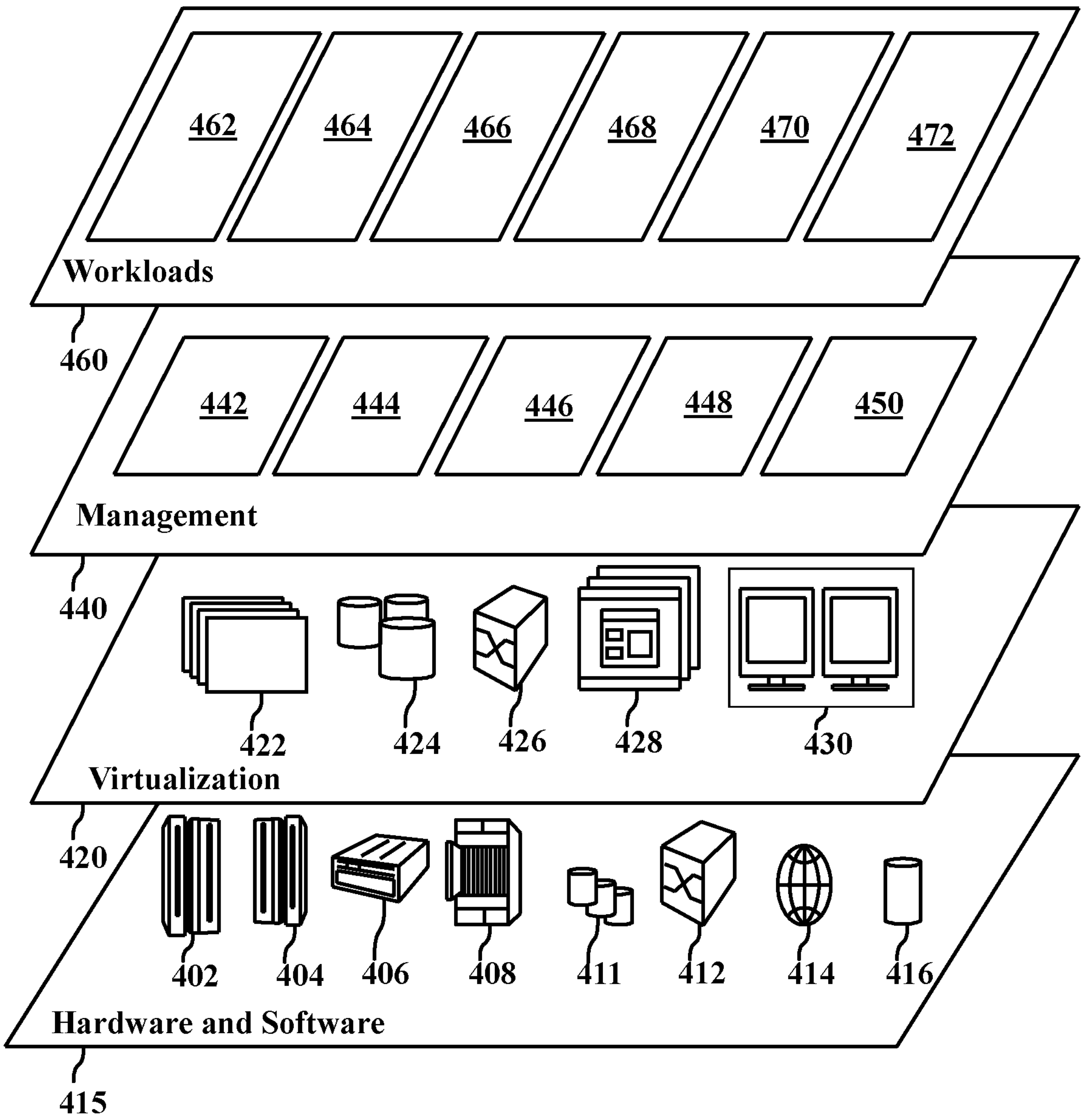
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and integrating different network segments and security components into containers and hybrid cloud environments 472.

Figure 5:
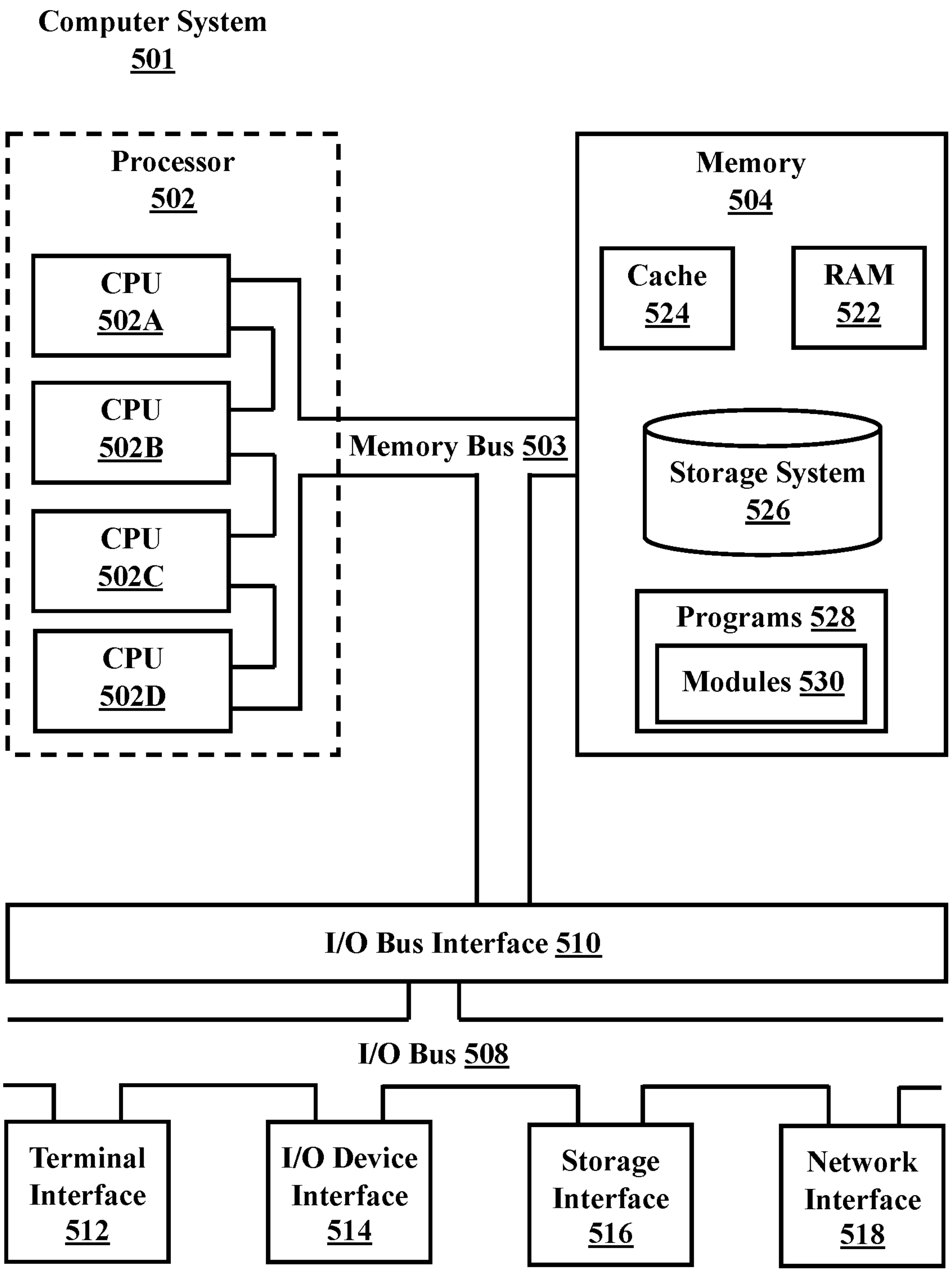
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:

a memory; and a processor in communication with the memory, the processor being configured to perform operations comprising:

identifying one or more requirements of a target hybrid cloud environment for migrating from an existing environment to the target hybrid cloud environment, wherein the one or more requirements pertain to a container within the target hybrid cloud environment;

storing the one or more identified requirements in a requirement specification related to the target hybrid cloud environment;

mapping the the one or more identified requirements of the target hybrid cloud environment to a set of network segments and security components, wherein the mapping enables an operationalization of a workload at the target hybrid cloud environment; and outputting the mapping of the one or more identified requirements of the target hybrid cloud environment as respective configuration files for use in generating the container in the target hybrid cloud environment.

2. The system of claim 1, wherein the processor is further configured to perform operations comprising:

integrating the mapping of the one or more requirements with the first-set of network segments and security components.

3. The system of claim 2, wherein the processor is further configured to perform operations comprising:

storing one or more changes in the respective configuration files; and collecting one or more assets used by a standard associated with the first-set of network segments and security components.

4. The system of claim 3, wherein the processor is further configured to perform operations comprising:

determining, based on the standard, a standard assignment; and executing, based on the standard assignment, a standard template.

5. The system of claim 3, wherein the processor is further configured to perform operations comprising:

determining, based on the standard, a custom assignment;

mapping, based on the custom assignment, custom requirements; and analyzing an outcome of the mapping.

6. The system of claim 5, wherein the processor is further configured to perform operations comprising:

storing data of the custom requirements;

storing a standard template associated with the custom requirements; and storing one or more changes of the standard template as a collected configuration file.

7. The system of claim 1, wherein the processor is further configured to perform operations comprising:

deriving audit requirements and regulatory compliance data from the set of network segments and security components.

8. The system of claim 7, wherein the operationalization of the workload at the target hybrid cloud environment is based on the derived audit requirements and regulatory compliance data.

9. A method comprising:

identifying one or more requirements of a target hybrid cloud environment for migrating from an existing environment to the target hybrid cloud environment, wherein the one or requirements pertain to a container within the target hybrid cloud environment;

storing the one or more identified requirements in a requirement specification related to the target hybrid cloud environment;

mapping the one or more identified requirements of the target hybrid cloud environment to a set of network segments and security components, wherein the mapping enables an operationalization of a workload at the target hybrid cloud environment; and outputting the mapping of the one or more identified requirements of the hybrid cloud environment as respective configuration files for use in generating the container in the target hybrid cloud environment.

10. The method of claim 9, further comprising:

integrating the mapping of the one or more requirements with the set of network segments and security components.

11. The method of claim 10, further comprising:

storing one or more changes in the respective configuration files; and collecting one or more assets used by a standard associated with the set of network segments and security components.

12. The method of claim 11, further comprising:

determining, based on the standard, a standard assignment; and executing, based on the standard assignment, a standard template.

13. The method of claim 11, further comprising:

determining, based on the standard, a custom assignment;

mapping, based on the custom assignment, custom requirements; and analyzing an outcome of the mapping.

14. The method of claim 13, further comprising:

storing data of the custom requirements;

storing a standard template associated with the custom requirements; and storing one or more changes of the standard template as a collected configuration file.

15. A computer program product comprising a computer readable storage medium having program instructions embodied therewith, the program instructions executable by a processor to cause the processor to perform a function, the function comprising:

identifying one or more requirements of a target hybrid cloud environment for migrating from an existing environment to the target hybrid cloud environment, wherein the one or requirements pertain to a container within the target hybrid cloud environment;

storing the one or more identified requirements in a requirement specification related to the target hybrid cloud environment;

mapping the one or more identified requirements of the target hybrid cloud environment to a set of network segments and security components, wherein the mapping enables an operationalization of a workload at the target hybrid cloud environment; and outputting the mapping of the one or more identified requirements of the target hybrid cloud environment as respective configuration files for use in generating the container in the target hybrid cloud environment.

16. The computer program product of claim 15, wherein the function further comprises:

integrating the mapping of the one or more requirements with the set of network segments and security components.

17. The computer program product of claim 16, wherein the function further comprises:

storing one or more changes in the respective configuration files; and collecting one or more assets used by a standard associated with the set of network segments and security components.

18. The computer program product of claim 17, wherein the function further comprises:

determining, based on the standard, a standard assignment; and executing, based on the standard assignment, a standard template.

19. The computer program product of claim 17, wherein the function further comprises:

determining, based on the standard, a custom assignment;

mapping, based on the custom assignment, custom requirements; and analyzing an outcome of the mapping.

20. The computer program product of claim 19, wherein the function further comprises:

storing data of the custom requirements;

storing a standard template associated with the custom requirements; and storing one or more changes of the standard template as a collected configuration file.

* * * * *